United States Patent Office 3,627,548
Patented Dec. 14, 1971

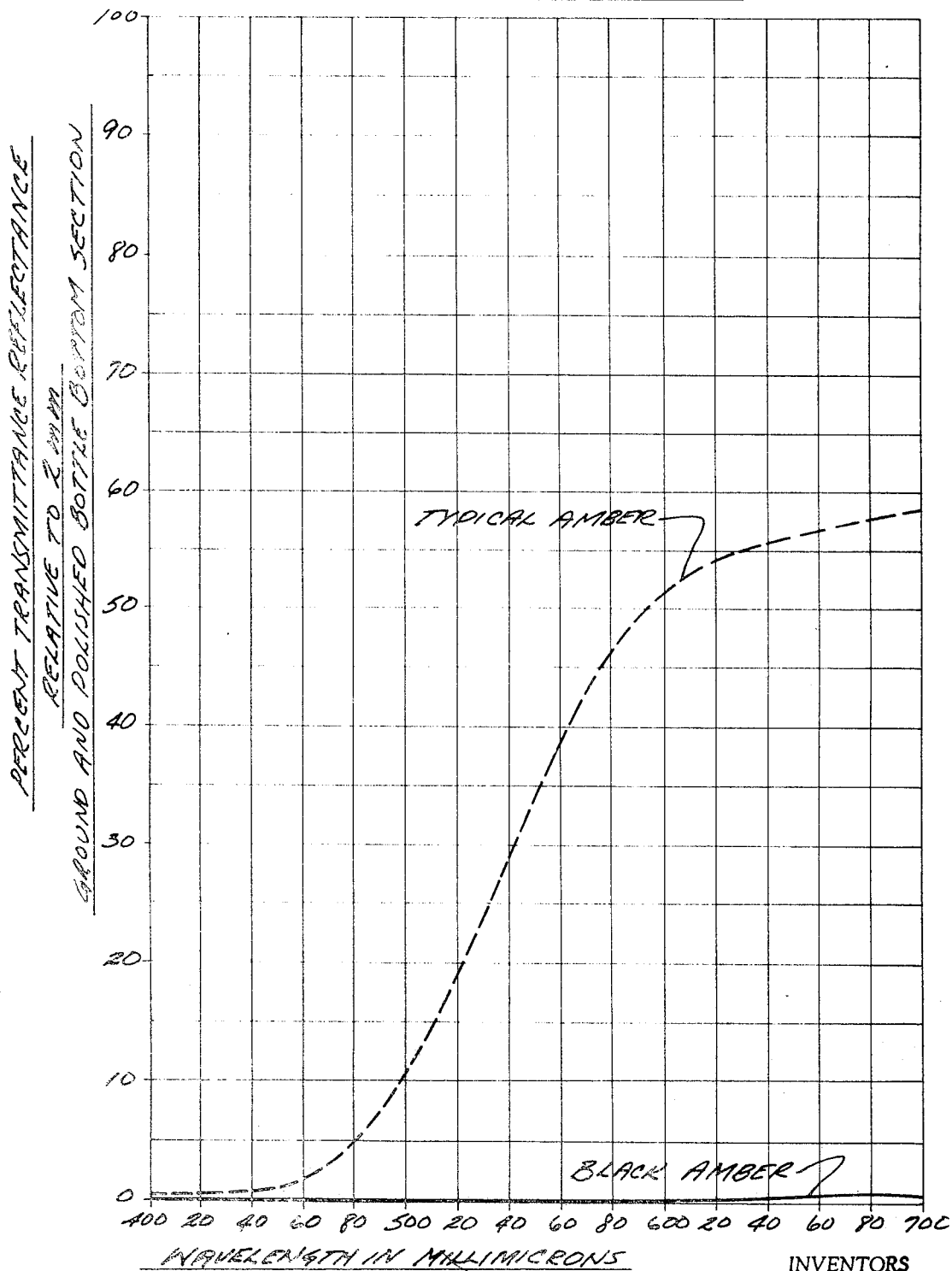

3,627,548
DARK AMBER GLASSES AND PROCESS
Friedrich W. Hammer and John Jasinski, Toledo, Ohio, assignors to Owens-Illinois, Inc.
Continuation-in-part of application Ser. No. 485,605, Sept. 7, 1965. This application Jan. 11, 1968, Ser. No. 697,169
Int. Cl. C03c *3/34, 5/02, 15/00*
U.S. Cl. 106—52
27 Claims

ABSTRACT OF THE DISCLOSURE

New dark or "black" amber glass compositions prepared from reduced amber base glasses to which is added copper oxide. The new glasses are characterized by extremely low brightness levels, for example, on the order of 5% or less in a 2 mm. thickness, whereby glass articles made therefrom visually appear black, hence the name "black amber" glasses. The copper oxide may be added to a melt of a base amber glass under appropriate conditions.

---

This application is a continuation-in-part of application, Ser. No. 485,605, filed Sept. 7, 1965, now Patent No. 3,513,003 issued May 19, 1970, the entire disclosure of which is relied on herein.

The present invention relates to new dark or "black" amber glass compositions and a process for making black amber glasses and articles therefrom. More particularly, copper oxide is incorporated into a melt of an amber base glass in a sufficient amount and under appropriate conditions whereby there is developed in the resulting glass composition an extremely dark coloration. The resulting glasses and articles made therefrom appear black to the eye of an observer. Extremely low levels of brightness are achieved which were not obtained in a satisfactory manner in the past.

Colored glasses are known in the prior art. Moreover, even darkly colored glasses have been previously prepared. However, the previous practice to achieve such an effect was to load a glass with high percentages of relatively expensive oxides, utilizing colorants which require a high degree of oxidation that are subject to instability, or using high concentrations of iron and sulfides in a glass with resultant melting and quality problems.

In the past, in order to produce deeply colored glasses, a method called "striking" has been resorted to. Thus, a melt is made which is lightly colored or clear, but wherein the glass contains a deep colorant in latent form. The deep color is actually developed by "striking" the ware after it is formed. The process of striking in a soda-lime composition comprises heating the ware to a temperature slightly above normal annealing temperatures, so that the latent colorant materials interact or "strike" to produce the deep color. Striking is not necessary when carrying out the present invention.

Recently a process of adding an enriched colorant frit glass to the forehearth has been developed. By means of the forehearth colorant technique, as many colors can be produced simultaneously from a single melting furnace as there are forehearths connected to the furnace. Further, smaller orders can be more easily handled by the forehearth technique than by the full melter operation.

However, considerable problems have been encountered when attempts have been made to introduce highly concentrated colorant frit glasses into a base glass in the forehearth. Often the decolorizers used in the base glass are incompatible with the frit glass.

Further, the incompatibility between the base glass and the frit glass often produces off-gas, particularly if either the frit glass or the base glass contains a reducing or oxidizing agent. The off-gas remains in the composite glass as tiny bubbles which are called seeds or blisters in the finished ware, and cause rejects in the ware. Generally, the melting and fining zones of glass melting furnaces are maintained at substantially higher temperatures than the forehearth. Thus, melting temperatures in the range of 2750–3000° F., and fining temperatures in the range of 2300–2450° F. are common for ordinary soda-lime compositions. These temperatures cause the viscosity of the glass to be reduced and the tiny bubbles of gas to be driven out, thus fining the molten glass.

However, temperatures in the forehearth must be reduced substantially so that the glass will have a sufficiently high viscosity to form properly. If the glass is too hot, it will be too fluid to form. Therefore, forehearth temperatures are generally reduced to the range of 2350° F. down to about 1950° F. At these temperatures the glass is of proper viscosity for forming but may be too viscous to be fined and have the seeds removed.

Also, the frit glasses heretofore used often have had such high softening and liquidus temperatures that they do not melt readily and do not mix thoroughly into the base glass at forehearth temperatures.

In addition, the forehearth colorant process is expensive because it requires the preparation of a frit glass. This is melted in a separate, special furnace at very high temperatures using selected materials including high ratios of colorant. The liquid frit is poured into water after forming to fracture and reduce it to granular form. After this, it is carefully dried. It is then added to a forehearth in carefully metered amounts to produce a colored composite glass. The present invention may be carried out without resorting to the glass frit-forehearth addition techniques and therefore is an improvement since it permits greater flexibility in operation.

Amber colored glass is widely used for the manufacture of containers which are intended to absorb ultraviolet radiation as well as visible light rays. Good protection for the radiation sensitive contents of the containers is thereby achieved. One of the most important commercial applications for amber glass is in the packaging of beer, the flavor of which is very adversely affected by exposure to light.

Accordingly, it is an object of the present invention to provide novel dark glasses.

A further object of the present invention is to provide a novel process for producing dark glass.

A still further object of the present invention is to provide a novel process for producing black amber glasses and articles made therefrom.

A still further object of the present invention is to provide novel black amber glasses and articles made therefrom.

In attaining the above and other objects, one feature of the invention resides in black amber glasses which are prepared by incorporating copper oxide, $Cu_2O$, into a reduced amber base glass.

A further feature of the invention resides in forming a melt of a reduced soda-lime amber glass in a furnace and introducing copper oxide therein and thereafter forming an article from the glass melt. The copper oxide reacts with selected components in the reduced amber base glass to form a chromophore which causes the amber glass to become very dark or black in color. The formation of the black metallic sulfide is primarily controlled by three factors: (1) the amount of copper oxide added; (2) the time and temperature of any subsequent heat treatment; and (3) the amount of sulfide present in the base glass. By the present invention, it is therefore possible to produce a variety of shades between dark amber and black by carefully controlling the amount of black copper sulfide that is ultimately formed in situ, in the reduced soda-lime base glass.

Further objects, features and advantages of the present invention will become apparent from the following detailed description thereof taken together with the figure which shows two spectral transmission curves, the uppermost curve, labeled "Typical Amber," being that of a typical amber container. The lower curve is that of a container made from a black amber glass of the present invention and shows the extremely low transmittance characteristics that are attainable by following the teachings of this invention.

The drawing is a graph of spectral transmission curves and shows transmission relative to 2 mm. ground and polished bottle bottom sections versus wavelength in millimicrons. The present invention enables the making of an outstanding ultraviolet and visible light absorbing glass which allows light protection for those products that need such protection. Because of the great depth of color, a superior opaque contrasting surface can be utilized for labeling and decorating. This invention achieves the above results at economics heretofore not attainable.

In carrying out the invention it has been found that the copper oxide can be added directly to the batch to be melted in the furnace or to the melt of the reduced amber base glass in the forehearth with suitable agitation to disperse the copper oxide in the glass. Thereafter, the glass may be shaped into any desired form by the methods employed in the art. The deep coloration can develop while the glass is being shaped into the desired article and/or during the annealing stage. If an even darker color is desired the ware may be "struck" to develop the final desired color of the glass. This is done by heating the ware to, for example, 150° F. above the normal annealing temperatures of the soda-lime glass.

While applicants do not wish to be restricted to any theory, it is believed that the coloration phenomenon is due to the formation of copper sulfides between the copper oxide and the sulfide sulfur present in the reduced amber base glass. Thus, the copper oxide takes the sulfide sulfur away from the iron. If the sulfur is present in the oxidized state, the striking will not take place. Therefore, the reaction is unique in the present invention to reduced amber base glasses.

The invention may be stated in another way. Thus, upon the addition of the copper oxide or upon striking, it appears that the copper oxide interacts with the sulfide of the iron sulfide to produce a very deeply colored copper sulfide. Either the iron takes the oxygen, or the oxygen is set free, with both the iron and oxygen remaining in a free state in the lattice of the glass. The phenomenon is not known exactly, but a black glass is produced.

A further phenomenon of the invention resides in the fact that the color is present in latent form in the molten glass due to the fact that the temperature of the furnace is too high for color formation therein. Thus, after the color in the glass is developed, the color will disappear again upon heating the glass back up to high temperatures; e.g., above about 1650° F. Since the temperature in the melting furnace is higher than this, the glass has no color other than the normal amber color of the base glass. Yet, upon cooling the color will again be produced. The cycle can be repeated as often as desired. This invention, therefore, makes possible large melts of amber glass with a copper oxide contained therein, but without undue detrimental effect on the heat transfer through the melt. Efficient processing is thereby provided.

In the broad aspect of the invention, no prior processing of the metallic oxide is necessary for useful addition to the reduced amber base glass. However, it is often desirable to utilize various purification and size reduction procedures if these can be economically performed. For example, the copper oxide may be in finely divided form, e.g., −200 mesh size U.S. screen series. Commercial grade copper oxide is satisfactory for the purposes described herein.

Reduced amber base glasses are used for the present invention. These glasses are lightly colored and may be melted in a radiant heat, fuel fired atmosphere. As observed in the industry, reduced amber glasses falling within relatively broad composition ranges are suitable for the production of food and beverage containers. Exhibiting high absorption for ultraviolet and visible rays, i.e., in the range of 400 to 700 millimicrons or less, amber glasses prevent destruction of the food or beverage contents placed within the containers made therefrom.

Generally, the batches for amber glasses contain iron and sulfur as the color producing constituents. Additionally, the batches contain a reducing agent such as sea coal. This converts the iron to the ferrous state and the sulfur to the sulfide state. These two substances combine into a "color complex or chromophore" in the molten glass, that absorbs most of the rays in the ultraviolet region and blue and also gives the glass its distinct amber color in the visible region.

The use of sea coal as a reducing agent is advantageous since it completely burns off at glass melting and fining temperatures and therefore does not affect the color of the composite glass. Other reducing agents that can be used include elemental silicon, aluminum, and graphite, although these are usually more expensive.

Typical reduced amber base glasses adapted for use in this invention will fall within the following compositional range:

TABLE I

| Component: | Percent by wt. |
| --- | --- |
| $SiO_2$ | 69.9–72.2 |
| $Al_2O_3$ | 1–4 |
| CaO | 10–13 |
| MgO | 0–5.5 |
| $R_2O$ (present as $Na_2O$, $K_2O$, or both, wherein $K_2O$ may be up to 10% of $R_2O$) | 12–15.5 |
| $Li_2O$ | 0–3 |
| BaO | 0–5 |
| Total iron as $Fe_2O_3$ | 0.05–0.5 |
| Total sulfur as sulfides | 0.02–0.08 |

The following are typical preferred amber glasses, into which copper oxide can be added by the present invention. Carbon, the reducing agent, is omitted from the table because it is burned off during melting and fining:

TABLE II.—COMPOSITION OF REDUCED AMBER BASE GLASSES

| Composition | Percent by weight | | |
| --- | --- | --- | --- |
| | A | B | C |
| Component: | | | |
| $SiO_2$ | 71.83 | 71.58 | 71.70 |
| $Al_2O_3$ | 1.89 | 1.92 | 1.89 |
| CaO | 10.49 | 10.56 | 10.49 |
| MgO | 0.71 | 1.05 | 0.71 |
| $Na_2O$ | 14.49 | 14.31 | 14.49 |
| $K_2O$ | 0.16 | 0.16 | 0.16 |
| Total iron as $Fe_2O_2$ | 0.20 | 0.17 | 0.20 |
| Total sulfur as $S^=$ | 0.026 | 0.037 | 0.031 |

The conditions and procedures for making glasses of the above type are known to the art: see Table IX, B–11, page 245 of "Handbook of Glass Manufacture," by Tooley, Ogden Publishing Company, New York, N.Y., 1953.

Normal amber has a brightness on 2 mm. thickness of about 33%, and by following the teachings of the present invention, brightness values of 0 to 5% are readily attainable.

In carrying out the invention, the composition is melted in a furnace preferably with agitation. Temperatures in the melting furnace vary depending on many factors. Satisfactory results have been obtained when the temperatures are in the range of 2400 to 2800° F. The requirements for agitation will also vary but sufficient agitation is necessary to get good mixing of the components. This can be conveniently accomplished by bubbling air into the melter. Again, the bubble rate will vary depending on many factors. Thus, the rate has been varied to include about 30 to 80 bubbles per minute with satisfactory results.

In accordance with the broad principles of the invention, the colorant technique involved can be applied to a broad range of reduced glasses containing sulfides. Accordingly, the exemplary amber glasses described are not to be considered limiting the invention. They are suggested as appropriate however for commercial container production. These glasses exhibit high absorption capacity for ultraviolet rays and visible rays, i.e., on the order of 400 to 700 m$\mu$ or less. Thus, these glasses prevent light destruction or modification due to photochemical effects of food or beverage contents placed in containers made of the glass. Composition A shown in Table II is a typical amber container composition and its spectral transmission curve is shown in the figure at the top by way of comparison so the significance of the present invention can be fully appreciated. The lower curve is a black amber glass with a brightness of 2.3%.

In a typical application of the present invention, a reduced amber glass is prepared in a melting furnace of several hundred tons capacity. The powdered copper oxide is mixed with the batch ingredients, which are added at the end of the melting zone and after fusion into molten glass, flow to the firing zone. The molten glass is issued out of the firing zone and may be run through one or a plurality of forehearths to an appropriate forming operation. Agitation can be conveniently provided by air bubblers in the furnace. Bubble rate can be varied according to size of furnace, amount of molten glass, etc.

When desirable to produce black amber glass from a forehearth rather than a full furnace, a reduced amber glass is prepared in a melting furnace and in issuing through a forehearth to the forming operation, the powdered copper oxide is metered into the molten glass in the forehearth. This may be effected by a suitable vibratory feeder and hopper arrangement or other metering device. The powdered copper oxide added is mixed with the molten glass by a suitable number of refractory stirrers to produce a homogeneous blend and a resulting black amber glass.

A typical batch composition is set forth below:

TABLE III

Sand—2000 lbs.
Soda—628 lbs.
Caustic—54 lbs.
Lime—626 lbs.
Clay—169 lbs.
Salt cake—11 lbs.
Cullet (from previous glass batch)—700–1000 lbs.
Iron pyrite—6½ lbs.
Carbocite—6½ lbs.
Sulfur—3 lbs.
Cuprous oxide—2 lbs. 5 oz.

To reduce the risk of forming insoluble copper sulfide stones and metallic copper shots, the $Cu_2O$ should preferably be premixed with the soda ash in the ratio of 1 part $Cu_2O$ to 4 parts soda ash. It has further been found that blast furnace slag, where available, may be used with satisfactory results as a source of the sulfide content of the composition.

The furnace adjustment requirements for operating such a batch are the same as for regular amber. The temperature, fuel, batch melt-down, and quality are very comparable to regular amber.

Further detailed information concerning batch ingredients is set forth below:

TABLE IV

| | |
|---|---:|
| White sand | 2000 |
| Soda ash | 672 |
| H.C. limestone | 665 |
| Feldspar | 321 |
| Salt cake | 11 |
| Iron pyrites | 8.5 |
| Sea coal | 5.0 |
| Cullet | 1000 |
| Theoretical composition, percent: | |
| $SiO_2$ | 72.12 |
| $Al_2O_3$ | 2.27 |
| $Fe_2O_3$ | 0.215 |
| $TiO_2$ | 0.013 |
| CaO | 11.42 |
| MgO | 0.12 |
| $Na_2O$ | 13.45 |
| $K_2O$ | 0.38 |
| $Cr_2O_3$ | 0.0002 |
| $P_2O_5$ | 0.008 |
| Glass made (tons) | 1.5507 |
| Log 2 viscosity (° F.) (actual) | 2670 |
| Log 2.5 viscosity (° F.) (actual) | 2395 |
| Log 3 viscosity (° F.) (actual) | 2185 |
| Log 7 viscosity (° F.) (actual) | 1405 |
| F.S.P. (° F.) | 1344 |
| A.P. (° F.) | 1018 |
| Cooling time (secs.) | 101 |
| Liquidus (° F.) (actual) | 1915 |
| Thermal expansion | 89.5 |
| Fusion loss | 581.02 |

Generally the melting and fining zones of glass are at temperatures in the range 2100–2800° F. These temperatures cause bubbles of occluded gas to be driven out of the melt and thus prevent seeds from being formed in the finished article or ware.

After the melting and fining occurs, the glass is passed out through the outlet to a forming machine or the like, such as a glass container forming machine. There the glass is formed and shaped into a piece of ware or article. While still hot, the article is then passed through an annealing lehr where the temperature is retained at a controlled level to remove strains imparted by the forming operation, and thereby condition the ware for its end use. This treatment enhances the strength of the ware substantially.

Lehr temperatures are normally in the range from about 950 to 1050° F. A temperature of about 100 to about 150° F. above lehr temperature can be utilized if desired to further darken the coloration of the glass. Thus, at some point during the lehr holding cycle, the temperature can be elevated by 150° F., for example, and held there for a short period of time to effect a further striking or deepening of the color. For example, in one operating procedure of the present invention, the ware was held at a temperatrue of 1130° F. for 15 minutes to effect the further striking.

In general, however, this higher temperature annealing step described above is not necessary and conventional annealing procedures may be utilized.

Practically any form of copper oxide can be used in the present invention. Unprocessed powdered copper oxide is satisfactory. Within the broader limits, however, mesh sizes in the range of −8 to 400 can be employed, with a mesh size of about −200 being generally preferred. Of course, the copper oxide should be reasonably pure as far as being free of high melting refractory-type particles. The copper oxide can also be supplied in the form of a glass frit.

Rates of addition for the copper oxide will be in the broad range to provide from about 0.03% to about 0.1% copper oxide in the glass.

The following table contains illustrative examples of the invention. The amber base glass corresponds to Composition A in Table II.

TABLE V.—COLOR AND CHEMICAL ANALYSIS DATA—BLACK AMBER GLASS

| Ex. | 2 mm. T-550 | Br. | Dom. wave | Percent Purity | $Fe_2O_3$ | $Cu_2O$ | $S^=$ |
|---|---|---|---|---|---|---|---|
| I | 2.9 | 3.7 | 589.7 | 98.1 | .222 | .098 | .031 |
| II | 2.6 | 3.3 | 588.2 | 97.1 | .232 | .098 | .032 |
| III | 1.8 | 2.3 |  |  | .228 | .098 | .038 |
| IV | 1.1 | 1.4 | 584.5 | 98.9 | .236 | .105 | .042 |

The following tables contain the transmission data on two samples of black amber prepared based on the batch ingredients in Table III.

TABLE VI.—Illumination C

| Wave length: | Thickness Measured, 2.130 mm. | Computed, 2.000 mm. |
|---|---|---|
|  | Transmittance | |
| 400 | 0.000 | 0.000 |
| 410 | 0.000 | 0.000 |
| 420 | 0.000 | 0.000 |
| 430 | 0.000 | 0.000 |
| 440 | 0.000 | 0.000 |
| 450 | 0.000 | 0.000 |
| 460 | 0.000 | 0.000 |
| 470 | 0.000 | 0.000 |
| 480 | .001 | .002 |
| 490 | .002 | .003 |
| 500 | .003 | .004 |
| 510 | .005 | .007 |
| 520 | .008 | .011 |
| 530 | .010 | .013 |
| 540 | .013 | .017 |
| 550 | .016 | .020 |
| 560 | .020 | .025 |
| 570 | .024 | .030 |
| 580 | .030 | .037 |
| 590 | .035 | .043 |
| 600 | .040 | .048 |
| 610 | .045 | .054 |
| 620 | .050 | .060 |
| 630 | .056 | .066 |
| 640 | .060 | .071 |
| 650 | .065 | .076 |
| 660 | .069 | .081 |
| 670 | .073 | .085 |
| 680 | .078 | .091 |
| 690 | .078 | .091 |
| 700 | .086 | .099 |

NOTES:
XBAR=3563.8; YBAR=2761; ZBAR=73.3; x=.55696; y=.43159. Percent brightness=2.76; percent purity=97.11; dom wave (m$\mu$)= 588.17.

TABLE VIII.—Illumination D

| Wave length: | Thickness Measured, 2.270 mm. | Computed, 2.000 mm. |
|---|---|---|
|  | Transmittance | |
| 400 | 0.000 | 0.000 |
| 410 | 0.000 | 0.000 |
| 420 | 0.000 | 0.000 |
| 430 | 0.000 | 0.000 |
| 440 | 0.000 | 0.000 |
| 450 | 0.000 | 0.000 |
| 460 | 0.000 | 0.000 |
| 470 | 0.000 | 0.000 |
| 480 | 0.000 | 0.000 |
| 490 | 0.000 | 0.000 |
| 500 | 0.000 | 0.000 |
| 510 | 0.000 | 0.000 |
| 520 | .001 | .002 |
| 530 | .001 | .002 |
| 540 | .001 | .002 |
| 550 | .001 | .002 |
| 560 | .002 | .004 |
| 570 | .002 | .004 |
| 580 | .002 | .004 |
| 590 | .002 | .004 |
| 600 | .003 | .006 |
| 610 | .003 | .006 |
| 620 | .003 | .006 |
| 630 | .003 | .006 |
| 640 | .003 | .006 |
| 650 | .004 | .008 |
| 660 | .004 | .008 |
| 670 | .004 | .008 |
| 680 | .005 | .009 |
| 690 | .005 | .009 |
| 700 | .005 | .009 |

NOTES:
XBAR=385.4; YBAR=326.0; ZBAR=3.5; x=.53913; y=.455$\mu$4. Percent brightness=.33; percent purity=98.89; dom. wave (m$\mu$)= 584.51.

The I.C.I. colorimetric values are based upon the I.C.I. Chromaticity Diagram. I.C.I. refers to the International Commission of Illumination and the diagram defines color in terms of mixtures of theoretical colored lights. The I.C.I. system makes possible the exact specification of colors by means of a "color map." The I.C.I. system of color notation specifies the color of glasses in terms of brightness, purity and dominant wave length. "Brightness," which is usually expressed in terms of percentage, is the amount of visual response in a normal observer to the radiation emergent from a transparent object relative to the response in this observer to the radiation incident upon the object. Thus, brightness may be briefly termed the lightness of color of an object. "Purity," which is also normally expressed in terms of percentage, is a measure of the monochromaticness of a color with monochromatic light having a purity of 100%. By diluting the monochromatic radiation with white light made up of all wave lengths, we thereby dilute the color and reduce the purity. "Dominant wave length," usually expressed in millimicrons (m$\mu$), is the wave length of monochromatic light appearing to the eye to have the same "hue" as the mixed light actually encountered.

In a further aspect of the present invention, small amounts of cobalt oxide, CoO, may be added to the glass melt in order to further deepen the color of the black amber glass. It has been found that about 0.01 to about 0.04% by weight is sufficient for this purpose. The following table contains examples of this feature of the invention. The base amber glass is Composition A in Table II. All amounts of ingredients are in weight percent.

TABLE VIII

|  | VI | VII | VIII |
|---|---|---|---|
| $Fe_2O_3$ | 0.221 | 0.221 | 0.221 |
| $S^=$ | 0.0274 | 0.0274 | 0.0274 |
| $Cu_2O$ | 0.096 | 0.096 | 0.096 |
| CoO | 0.01 | 0.02 | 0.03 |
| Percent brightness (2 mm.) | 2.90 | 2.49 | 0.81 |
| Percent purity (2 mm.) | 97.19 | 96.22 | 93.20 |
| D.W., m$\mu$ | 589.35 | 587.56 | 584.89 |
| Percent T. (a) 550 (2 mm.) | 2.2 | 2.0 | 0.8 |

An important advantage of the present invention resides in the fact that it enables the manufacturer of regular amber glass to convert his product to black amber and then back to regular amber with relative ease. For example, cullet obtained from a previous black amber production can be used in the production of normal amber. Thus, the present invention permits a manufacturer of regular amber glassware to use an existing facility to produce an entire new family of glasses. The following table shows the transition from regular amber production to black amber.

perature gradient is reversed positionwise, the original nuclei will not go back into solution, but on the contrary, will grow in size and become brown in color. This result can be observed up to 2500° F.

In general, opalescence in black glasses appears similar to the devitrification of glass. In the latter case, a temperature range for the development of nuclei exists. Likewise, a temperature range for the growth of nuclei to

TABLE IX.—TRANSITION REGULAR AMBER TO BLACK AMBER

|  | Regular | Step No. 1 | Step No. 2 | Step No. 3 | Black |
|---|---|---|---|---|---|
| Sand | 2,000 lbs | 2,000 lbs | 2,000 lbs | 2,000 lbs | 2,000 lbs. |
| Soda ash | 628 lbs | 628 lbs | 628 lbs | 628 lbs | 628 lbs. |
| Limestone | 626 lbs | 626 lbs | 626 lbs | 626 lbs | 626 lbs. |
| Clay (source of $Al_2O_3$) | 169 lbs | 169 lbs | 169 lbs | 169 lbs | 169 lbs. |
| Caustic | 54 lbs | 54 lbs | 54 lbs | 54 lbs | 54 lbs. |
| Salt cake | 11 lbs | 11 lbs | 11 lbs | 11 lbs | 11 lbs. |
| Iron pyrites | 6 lbs., 12 oz | 6 lbs., 12 oz | 6 lbs., 12 oz | 6 lbs., 12 oz | 6 lbs., 12 oz. |
| Carb-o-cite | 4 lbs., 8 oz | 4 lbs., 8 oz | 4 lbs., 8 oz | 4 lbs., 8 oz | 4 lbs., 8 oz. |
| Sulfur | 2 lbs., 12 oz | 2 lbs., 12 oz | 2 lbs., 12 oz | 2 lbs., 12 oz | 2 lbs., 12 oz. |
| $Cu_2O$ | 0 | 12 lbs., 12 oz | 7 lbs., 8 oz | 6 lbs., 8 oz | 2 lbs., 5½ oz. |
| Cullet | 700 lbs | 700 lbs | 700 lbs | 700 lbs | 700 lbs. |
| No. of batches |  | 25 | 15 | 8 |  |

NOTES:
(1) Cullet level constant at 700 lbs. per ton sand.
(2) $Cu_2O$ may be mixed with soda ash in the ratio 1-4. Deduct weight of soda ash used in the mix from the weight of soda ash used in the batch.
(3) Operate all bubblers at speed used in regular amber.

It has been observed that under certain conditions black glasses made by the addition of copper oxide to reduced amber base glasses develop opalescence. This term may be defined as follows:

The formulation of small micro particles (nuclei) by various time-temperature conditions. Collectively, these particles reflect sufficient light to produce opalescence. This condition is best observed under reflected light.

Several other definitions relating to this subject are listed below.

Maximum Nucleation Temperature (Opal Point)

The maximum temperature at which nuclei develop during a specific period of time and it is a function of the specific glass composition.

Chocolate Black Glass

A term which has been associated with the CuO-amber glasses which appear chocolate in color when observed under reflected light.

The test devised for observing this condition is essentially identical to the temperature gradient method of determining the liquidus temperature of glasses.

Thus, strips of glass were cut from the sidewalls of the black glass bottles and placed in a platinum-rhodium liquidus boat. Samples were placed directly from room temperature into the desired temperature gradient for various periods of time.

It has been noted that nucleation occurred during relatively short periods of time. To determine the approximate time necessary to obtain the maximum nucleation temperature, samples were run at intervals of 5, 10, 15, 20, and 30 minutes. It was immediately evident that reproducibility was achieved within 20 minutes. One sample was run for a period of 110 minutes and the resulting maximum nucleation temperature was essentially identical to that obtained for a 20-minute period. On the basis of these results, the majority of the tests were run at 10 and 20 minutes. Changes in compositions and other factors will determine the optimum time to achieve opalescence.

Collected data indicates that the maximum nucleation temperature increases with an increase in copper oxide and generally with an increase in sulfide content. At higher levels of copper oxide, the effect of increased sulfide content diminishes rapidly.

When a sample which has been nucelated in the temperature gradient is reversed positionwise, the original actual crystals exists for each devitrifiable glass composition.

Optimum conditions exist for development of the chocolate opalescence effect when the present invention is carried out with the forehearth addition technique. This may be due to possibly less homogeneity in the forehearth than in the full tank operation.

TABLE X

| Sample | Percent | | Opal point, °F. | Time, min. |
|---|---|---|---|---|
|  | $Cu_2O$ | S= | | |
| Batch Table IV | 0.066 | 0.0489 | 2,115 | 20 |
|  | 0.066 | 0.0489 | 2,120 | 20 |
|  | 0.079 | 0.0468 | 2,135 | 20 |
|  | 0.079 | 0.0468 | 2,140 | 20 |

In general, the greater the cuprous oxide percentage, the higher the temperature of the opal point. The opal point is also influenced by the sulfide level, but the sulfide is not as influential as the cuprous oxide. As an example, a glass containing .073% $Cu_2O$, .043% sulfides, and .215% $Fe_2O_3$ produces a brightness, depending on lehring, and has an opal point of 2140° F.

Table X gives representative opal points for compositions of the present invention. Generally, if the melter is operated with a minimum bottom glass temperature of 2375° F. measured about 2 feet from the throat, opalescence will not be achieved; therefore, opalescence can be produced at temperatures from 2100° F. to 2350° F. for periods of from 10 to 30 minutes, preferably about 20 minutes.

It is understood that various other modifications will be apparent to and can readily be made by those skilled in the art without departing from the scope and spirit of this invention.

We claim:
1. A process for making a dark amber glass article comprising the steps of adding to an amber base glass containing iron and sulfur as the amber color-producing ingredients a sufficient amount of copper oxide and reacting the copper with the sulfur in the amber base glass at an elevated temperature and for a period of time to thereby produce a dark coloration in the glass, wherein the amount of sulfur expressed as sulfide in the finished glass article is present up to about 0.08% by weight, said dark glass article having a brightness value of 0 to 5% in a 2 mm. thickness.

2. A process for making a dark colored glass article comprising the steps of adding to a base glass containing iron and sulfur as the color producing ingredients a sufficient amount of copper oxide and reacting the copper with the sulfur in the base glass at an elevated temperature and for a period of time to thereby produce a dark coloration in the glass, wherein the amount of sulfur expressed as sulfide in the finished glass article is present up to about 0.08% by weight, said dark glass article having a brightness value of 0 to 5% in a 2 mm. thickness.

3. A process for making dark colored glass articles comprising the steps of adding to a soda-lime-silica glass containing a sulfide component in the forehearth a sufficient amount of copper oxide and reacting the copper oxide with the sulfide component in the silica glass at an elevated temperature and for a period of time whereby there is formed in the glass a dark coloration and wherein the amount of sulfur present expressed as sulfide in the finished glass article is from 0.02 to 0.08% by weight.

4. A process for making a dark amber glass article comprising the steps of adding to an amber base glass containing iron and sulfur as the amber color producing ingredients a sufficient amount of copper oxide and subjecting the amber base glass to a sufficiently high temperature and for a sufficient period of time whereby the copper and the sulfur react to form a darkly colored reaction product, the amount of sulfur present expressed as sulfide in the finished glass article being from 0.02 to 0.08% by weight.

5. The process defined in claim 4 wherein the amber base glass comprises the following:

| Component: | Percent by wt. |
|---|---|
| $SiO_2$ | 69.9–72.2 |
| $Al_2O_3$ | 1–4 |
| $R_2O$ (present as either $Na_2O$, $K_2O$, or both) | 12–15.5 |
| RO (present as either CaO, MgO, or both) | 10–13 |

6. The process defined in claim 4 wherein copper oxide is added in the amount of from 0.03 to 0.1% by weight.

7. The process defined in claim 4 wherein the iron content of the finished glass article expressed as $Fe_2O_3$ ranges from 0.05 to 0.5 percent by weight.

8. The process of claim 4 wherein copper oxide is included in the amber base glass melt in the furnace and the glass melt is agitated to achieve mixing of the components, and thereafter the article is subjected to an annealing heat treatment.

9. The process defined in claim 4 wherein the copper oxide is added to the molten amber glass in the forehearth.

10. The process of claim 4 wherein the amber base glass has the following composition:

| Component: | Percent by wt. |
|---|---|
| $SiO_2$ | 69.9–72.2 |
| $Al_2O_3$ | 1–4 |
| CaO | 10–13 |
| MgO | 0–5.5 |
| $R_2O$ (present as $Na_2O$, $K_2O$, or both, and wherein $K_2O$ may be up to 10% of the total $R_2$) | 12–15.5 |
| $Li_2O$ | 0–3 |
| BaO | 0–5 |
| Total iron as $Fe_2O_3$ | 0.05–0.5 |
| Total sulfur as sulfides | 0.02–0.08 |

11. The process of claim 4 wherein the reduced amber base glass has the following composition:

| Component: | Percent by wt. |
|---|---|
| $SiO_2$ | 71.83 |
| $Al_2O_3$ | 1.89 |
| CaO | 10.49 |
| MgO | 0.71 |
| $Na_2O$ | 14.49 |
| $K_2O$ | 0.16 |
| $Fe_2O_3$ | 0.20 |
| Sulfur as $S^=$ | 0.026 |

12. The process of claim 4 wherein the reduced amber base glass has the following composition:

| Component: | Percent by wt. |
|---|---|
| $SiO_2$ | 71.58 |
| $Al_2O_3$ | 1.92 |
| CaO | 10.56 |
| MgO | 1.05 |
| $Na_2O$ | 14.31 |
| $K_2O$ | 0.16 |
| $Fe_2O_3$ | 0.17 |
| Sulfur as $S^=$ | 0.037 |

13. The process of claim 4 wherein the reduced amber base glass has the following composition:

| Component: | Percent by wt. |
|---|---|
| $SiO_2$ | 71.70 |
| $Al_2O_3$ | 1.89 |
| CaO | 10.49 |
| MgO | 0.71 |
| $Na_2O$ | 14.49 |
| $K_2O$ | 0.16 |
| $Fe_2O_3$ | 0.20 |
| Sulfur as $S^=$ | 0.031 |

14. The process of claim 4 wherein the brightness of the finished glass article ranges from 0 to 5% based on a 2 mm. thickness.

15. The process of claim 4 wherein cobalt oxide is added in addition to the copper oxide in an amount from about 0.01 to about 0.04 by weight.

16. The process of making chocolate brown amber glass articles comprising the steps of including copper oxide and sulfide sulfur in a reduced amber base glass in sufficient amount to permit the development of opelescence within the glass, retaining the copper and sulfide-containing reduced amber base glass at or adjacent the opal point for a sufficient period of time to permit the development of small micro particles adapted to light reflectance upon cooling of the glass, shaping a portion of the glass into the desired article, and subsequently annealing and cooling the shaped article to produce an opalescent chocolate brown amber colored glass article.

17. The process of claim 16 wherein the period of time is about 20 minutes.

18. A black amber glass composition comprising the following:

| Component: | Percent by wt. |
|---|---|
| $SiO_2$ | 69.9–72.2 |
| $Al_2O_3$ | 1–4 |
| CaO | 10–13 |
| MgO | 0–5.5 |
| $R_2O$ ($Na_2O$, $K_2O$, or both) | 12–15.5 |
| $Li_2O$ | 0–3 |
| BaO | 0–5 |
| Total iron as $Fe_2O_3$ | 0.1–0.3 |
| Total sulfur as sulfides | 0.025–0.08 |
| Total copper oxide as $Cu_2O$ | 0.03–0.1 |

19. A black amber glass composition as defined in claim 18 which comprises:

| Component: | Percent by wt. |
|---|---|
| $SiO_2$ | 71.83 |
| $Al_2O_3$ | 1.89 |
| CaO | 10.49 |
| MgO | 0.71 |
| $Na_2O$ | 14.49 |
| $K_2O$ | 0.16 |
| $Fe_2O_3$ | 0.20 |
| Sulfur as S= | 0.026 |
| $Cu_2O$ | 0.03–0.1 |

20. A shaped black glass article made from the composition defined in claim 18.

21. A black glass beer container made from the composition defined in claim 18.

22. The composition as defined in claim 18 wherein the brightness ranges from 0 to 5% on a 2 mm. thickness.

23. The composition as defined in claim 18 wherein cobalt oxide is additionally present in an amount of 0.01 to 0.04%.

24. A process for making a black amber glass article comprising the steps of adding to a sulfide-containing amber base glass in the forehearth, a mixture of copper oxide and cobalt oxide wherein the amount of copper oxide ranges from 0.03 to 0.1% and the amount of cobalt ranges from 0.01 to 0.04% by weight based on the total weight of the glass.

25. The process for making a dark amber glass article as defined in claim 4 wherein cobalt oxide is added with the copper oxide in the base glass to form a dark coloration.

26. The process for making a dark amber glass article as defined in claim 4 which further includes the step of developing a dark color by heating the article to a temperature of at least 150° F. above the normal annealing temperature of the base glass.

27. A process of making a dark glass article as defined in claim 2 which includes the further step of developing a dark color by heating the article to a temperature of at least 150° F. above the normal annealing temperature of the base glass.

References Cited

UNITED STATES PATENTS

| | | | |
|---|---|---|---|
| 1,899,230 | 2/1933 | Crowell | 65—52 X |
| 1,947,781 | 2/1934 | Kreidl | 65—30 X |
| 1,951,213 | 3/1934 | Schlumbohm | 106—52 X |
| 2,662,826 | 12/1953 | Schuepp | 106—48 X |
| 3,003,886 | 10/1961 | Pither | 106—52 |
| 3,148,994 | 9/1964 | Voss | 65—33 X |
| 3,169,217 | 2/1965 | Dalton | 106—48 X |
| 3,479,193 | 11/1969 | Seeley et al. | 106—521 |
| 3,502,454 | 3/1970 | Schoenbarger | 106—52 X |
| 3,511,629 | 5/1970 | Bauer et al. | 106—52 |
| 3,513,003 | 5/1970 | Hammer et al. | 65—346 |

OTHER REFERENCES

"Coloured Glasses," by Woldemar Weyl, published by Dawson's of Pall Mall, London, 1959, pp. 279 to 281 and 428 to 429.

FRANK W. MIGA, Primary Examiner

U.S. Cl. X.R.

65—30, 32, 33, 134; 106—48

PO-1050
(5/69)

UNITED STATES PATENT OFFICE
CERTIFICATE OF CORRECTION

Patent No. 3,627,548  Dated December 14, 1971

Inventor(s) FRIEDRICH W. HAMMER and JOHN JASINSKI

It is certified that error appears in the above-identified patent and that said Letters Patent are hereby corrected as shown below:

Col. 1, line 33, "colaration" should be --coloration--.
Col. 4, line 66, "$Fe_2O_2$" should be --$Fe_2O_3$--.  Col. 7, Table VI, under Notes:, "YBAR=2761" should be --YBAR=2761.7.  Col. 8, "Table VIII" should be --Table VII--; "Illumination D" should be --Illumination C--; Col. 8, line 30, ".455$\mu$ 4" should be --.45594--.

Signed and sealed this 29th day of April 1975.

(SEAL)
Attest:

RUTH C. MASON
Attesting Officer

C. MARSHALL DANN
Commissioner of Patents
and Trademarks